(12) United States Patent
Yoon et al.

(10) Patent No.: US 12,258,434 B2
(45) Date of Patent: Mar. 25, 2025

(54) EXPANDED FOAM SOLUTION AND THERMOSETTING EXPANDED FOAM HAVING EXCELLENT FLAME RETARDANCY USING THE SAME

(71) Applicant: KYUNG DONG ONE CORPORATION, Seoul (KR)

(72) Inventors: Jong Hyun Yoon, Seoul (KR); Sang Yun Lee, Seoul (KR); Dae Woo Nam, Seoul (KR)

(73) Assignee: KYUNG DONG ONE CORPORATION, Seoul (KR)

( * ) Notice: Subject to any disclaimer, the term of this patent is extended or adjusted under 35 U.S.C. 154(b) by 0 days.

(21) Appl. No.: 18/336,277

(22) Filed: Jun. 16, 2023

(65) Prior Publication Data

US 2023/0331897 A1    Oct. 19, 2023

Related U.S. Application Data

(60) Division of application No. 17/225,742, filed on Apr. 8, 2021, now Pat. No. 11,976,155, which is a continuation-in-part of application No. PCT/KR2019/013393, filed on Oct. 11, 2019.

(30) Foreign Application Priority Data

Oct. 12, 2018  (KR) .......................... 10-2018-0121633

(51) Int. Cl.
| | |
|---|---|
| C08G 18/20 | (2006.01) |
| C08G 18/22 | (2006.01) |
| C08G 18/42 | (2006.01) |
| C08G 18/48 | (2006.01) |
| C08G 18/76 | (2006.01) |
| C08J 9/00 | (2006.01) |
| C08K 3/34 | (2006.01) |
| C08K 5/5415 | (2006.01) |
| C08K 7/26 | (2006.01) |
| C08K 9/06 | (2006.01) |

(52) U.S. Cl.
CPC ....... *C08G 18/2036* (2013.01); *C08G 18/225* (2013.01); *C08G 18/42* (2013.01); *C08G 18/48* (2013.01); *C08G 18/76* (2013.01); *C08J 9/008* (2013.01); *C08K 3/346* (2013.01); *C08K 5/5415* (2013.01); *C08K 7/26* (2013.01); *C08K 9/06* (2013.01); *C08G 2110/005* (2021.01); *C08J 2203/10* (2013.01); *C08J 2375/06* (2013.01); *C08J 2375/08* (2013.01); *C08K 2201/005* (2013.01); *C08K 2201/011* (2013.01)

(58) Field of Classification Search
CPC .... C08G 18/092; C08G 18/163; C08G 18/18; C08G 18/2036; C08G 18/225; C08G 18/302; C08G 18/42; C08G 18/48; C08G 18/76; C08G 18/7621; C08G 18/7671; C08G 2110/0025; C08G 2110/005; C08J 9/008; C08J 9/009; C08J 9/144; C08J 2203/10; C08J 2203/142; C08J 2375/04; C08J 2375/06; C08J 2375/08; C08K 3/016; C08K 3/34; C08K 3/346; C08K 5/523; C08K 5/5415; C08K 7/26; C08K 9/04; C08K 9/06; C08K 2201/005; C08K 2201/011

See application file for complete search history.

(56) References Cited

U.S. PATENT DOCUMENTS 4,511,688 A  *  4/1985  Termine ............... C08G 18/381
                                                              524/380

FOREIGN PATENT DOCUMENTS

| KR | 10-2004-0059499 A | 7/2004 |
|---|---|---|
| KR | 10-2005-0088042 A | 9/2005 |
| KR | 10-0882307 B1 | 2/2009 |

OTHER PUBLICATIONS

Semenzato et al., "A novel phosphorus polyurethane FOAM/montmorillonite nanocomposite: Preparation, characterization and thermal behaviour", Applied Clay Science, 2009, pp. 35-42, vol. 44 See page 36.

Wilkinson et al., "Structure Development in Flexible Polyurethane Foam-Layered Silicate Nanocomposites", Macromol. Symp. , 2007, pp. 65-72, vol. 256.

* cited by examiner

*Primary Examiner* — John M Cooney
(74) *Attorney, Agent, or Firm* — NKL Law; Jae Youn Kim

(57) ABSTRACT

The present disclosure relates to an expanded foam solution for forming a thermosetting expanded foam having excellent flame retardancy produced using the same. According to the present disclosure, nanoclay is mixed with a polyol-based compound using ultrasonic waves, an isocyanate-based compound is added, and a trimerization catalyst or an isocyanurate compound is mixed with the polyol-based compound so that an isocyanurate structure is formed.

5 Claims, 9 Drawing Sheets

|  | Before burning | After burning |
|---|---|---|
| Comp. Example 9 | | |
| Comp. Example 10 | | |
| Comp. Example 11 | | |
| Comp. Example 12 | | |

FIG. 9

EXPANDED FOAM SOLUTION AND THERMOSETTING EXPANDED FOAM HAVING EXCELLENT FLAME RETARDANCY USING THE SAME

CROSS-REFERENCE TO RELATED APPLICATIONS

This application is a divisional application of U.S. patent application Ser. No. 17/225,742, filed on Apr. 8, 2021, which claims the priority of continuation-in-part of PCT/KR2019/013393, filed Oct. 11, 2019, which further claims priority to KR10-2018-0121633, filed Oct. 12, 2018, the entire disclosure of which is incorporated herein by reference.

TECHNICAL FIELD

The present disclosure relates to an expanded foam solution and a thermosetting expanded foam produced using the same, and more particularly, to the thermosetting foam having an excellent flame retardancy prepared by the method including: in order to provide a polyurethane foam for construction having excellent flame retardancy; mixing nanoclay with a polyol-based compound using ultrasonic waves; adding an isocyanate-based compound thereto; and mixing a trimerization catalyst or an isocyanurate compound with the polyol-based compound to form an isocyanurate structure, and to a thermosetting expanded foam produced using the same.

BACKGROUND ART

The Ministry of Land, Infrastructure and Transport of the Republic of Korea significantly strengthened the fire safety standards of building finishing materials by revising the 'rules on standards for evacuation/fire protection structures of buildings, etc.', and these revised rules have taken effect from April 2016. In particular, huge losses of both life and property have occurred due to large fire accidents that have occurred recently, and for this reason, heat-insulating materials having excellent fire safety and heat insulation properties have attracted attention. However, in spite of this demand, technology for producing heat-insulating materials having excellent flame retardancy and the supply of products obtained using the same remains insufficient. Materials that are used as heat-insulating materials for buildings include expanded polystyrene foam (EPS), glass fiber, phenolic foam, polyurethane (hereinafter referred to as "PU") foam and polyisocyanurate (hereinafter referred to as "PIR") foam. EPS foam is the most common insulation material, but has been pointed out as one of the major causes of large fire accidents because it easily catches fire. Glass fiber has low heat-insulation properties and is classified as a material harmful to the human body, and thus its use is limited. Phenolic foam has been in the spotlight as an organic heat-insulating material having excellent heat insulation and flame retardant performance, but has problems in that, when it absorbs moisture, the heat insulation property thereof extremely deteriorates, and the surrounding construction subsidiary materials are corroded due to the generation of acid. In addition, phenolic foam has low workability due to its poor adhesion to the adherend surface of a construction material. PU foam and PIR foam have various excellent properties such as heat insulation performance, water resistance, processability and workability, but have a problem in that they have relatively low flame retardancy, and thus their function of preventing the spread of fire in a fire situation is relatively poor.

In the PU foam- and PIR foam-related industry, extensive efforts have recently been made to improve flame retardant performance which is the shortcoming of these foams. There are various methods of making materials flame-retardant. One of these methods is the application of expansion agents that induce expansion by high temperature to form a barrier against the flame in a fire situation. The expansion agents may be divided into an organic expansion agent and an inorganic expansion agent. The organic expansion agent has a low specific gravity and has high processability due to its high compatibility with organic materials such as PU or PIR. However, the organic expansion agent has poor flame retardant performance because it is an organic material that easily catches fire. The inorganic expansion agent has excellent flame retardant performance. However, the inorganic expansion agent has high specific gravity, and is likely to undergo phase separation such as precipitation due to its high incompatibility with an organic material. In addition, although the inorganic expansion agent blocks the spread of a flame by expansion in a fire situation, this blocking is temporary, and if the flame is continuously applied, the foam collapses due to melting, and thus the flame retardant performance thereof is degraded again. Another method of making materials flame-retardant is a method of adding flame retardants. Organic flame retardants have a disadvantage in that they generate gases harmful to the human body when catching fire. Inorganic flame retardants have a problem in that the mechanical and physical properties thereof are degraded. In addition, the introduction of these flame retardants alone is very insufficient to satisfy current requirements for the fire safety of building finishing materials.

In order to solve the above problems, it is important to maximize flame retardant performance by addition of flame retardants or flame retardant additives while maintaining mechanical and physical properties. In recent years, nanocomposite materials containing various nanoparticles have been developed, and particularly, research results have been reported that proper dispersion of nanoclay in these materials improves flame retardant performance to a certain level or more. Regarding flame retardant properties which are achieved through nanoclay, nanoclay particles having a large aspect ratio, obtained through nanoclay intercalation and exfoliation, exert their performance through an action that blocks heat and effectively prevents fire spread in a fire situation by increasing their contact area with these resins.

However, if the techniques of effectively dispersing, intercalating and exfoliating nanoclay in these materials are not completely accomplished, the nanoclay is nothing more than a simple inorganic flame retardant, and can merely cause the adverse effect of lowering mechanical and physical performance, rather than improving flame retardant performance. In addition, only when the material itself as a matrix has a certain degree of flame retardancy, the performance thereof is maximized. Some foreign companies and researchers have attempted to improve flame retardant performance by dispersing nanoclay in a PU-based matrix, but this attempt did not lead to mass production because the effect thereof was remarkably low for the added process cost. In addition, in this case, situations that end only with research were often presented.

The nanoclay contains components, including silicon, aluminum, magnesium and oxygen, and has a basic layered structure composed of a silica tetrahedron and an alumina octahedron, which are present at a ratio of 1:1 or 1:2. Each nanoclay layer has a thickness of 1 to nm and a length of 30 to 1000 nm, and the spacing between nanoclay layers is a few Å (1 Å=10 nm).

Dispersion methods for intercalating a resin into the interlayer space of the nanoclay and exfoliating the nanoclay include a solution dispersion method, a melting method, and an ultrasonic method. The solution dispersion method is a method of inducing a resin to be intercalated into the interlayer space of the nanoclay through stirring when the interlayer spacing of the nanoclay is expanded while the nanoclay is swollen in a liquid phase. The problem at this time is that, since the nanoclay is aggregated by the Van der Waals attraction acting between the nanoclay layers, the intercalation efficiency is very low and exfoliation of the nanoclay is more difficult than the intercalation. The melting method has a limitation that a thermoplastic resin capable of melting at a processing temperature of 200° C. or less should be used, and it is difficult to apply the melting method to thermosetting foam. The ultrasonic method is a method of maximally expanding the interlayer space of nanoclay through application of a certain level or higher of ultrasonic waves, intercalating a resin into the interlayer space and exfoliating the nanoclay. The efficiency of intercalation into the nanoclay interlayer space or exfoliation of the nanoclay layers changes depending on the ultrasonic intensity, and thus control is absolutely necessary.

The effect appears only when the resin is liquid and the viscosity thereof does exceed a certain level. Nanoclay contains a minimum amount of moisture even after it is organically modified. Therefore, the resin should not be reactive with moisture, and if it is reactive, it may cause irreversible changes over time, thereby degrading physical properties.

In Korean Patent Application Nos. 10-2017-0085232, 10-2011-0031592, 10-2010-0082116, 10-2007-0122780, 10-2002-0083028, and 10-2002-0083066, the solution dispersion method is used to intercalate a resin into the interlayer space of nanoclay. As mentioned above, since the nanoclay is aggregated by the Van der Waals attraction between the nanoclay layers, the intercalation efficiency of the resin is low, and exfoliation of the nanoclay is more difficult than the intercalation. Thus, the effect is not sufficient. In Korean Patent Application Nos. 10-2007-0140846, 10-2005-0012348 and 10-2005-0000687, nanoclay is mixed with an isocyanate-based resin, and intercalation of the resin is induced by applying ultrasonic waves. However, since the isocyanate-based resin irreversibly reacts even with a very small amount of moisture contained in the nanoclay, changes over time occur. Even if the nanoclay is dried, moisture cannot be completely removed therefrom, and even if it is assumed that the nanoclay is completely dried, intercalation of the resin into the nanoclay interlayer space by ultrasonic waves alone is difficult due to aggregation of the nanoclay. In addition, the purpose is different from the present disclosure aimed at maximizing flame retardant performance using nanoclay.

Korean Patent Application Publication No. 10-2015-0063990 discloses a thermosetting foam having improved flame retardancy, which includes an isocyanurate structure using a trimerization catalyst. Although the thermosetting foam is an excellent base material, the effect thereof is decreased rather than increased, because the nanoclay is applied by a solution dispersion method based on stirring.

Meanwhile, technology of making organic heat-insulating materials flame-retardant is very important in view of the fact that regulations on fire safety are increasingly being strengthened. A heat-insulating material consisting of a single material that has a total weight loss of 6.5 g or less for 5 minutes after the start of the burning test according to ISO 5660-1 is hard to find anywhere.

DISCLOSURE

Technical Problem

The present disclosure has been made in order to solve the above-described problems, and an object of the present disclosure is to provide a thermosetting expanded foam solution for forming a foam prepared by the method including mixing nanoclay with a polyol-based compound using ultrasonic waves, adding an isocyanate-based compound thereto, allowing the polyol-based compound and the isocyanate-based compound to react in the expanded interlayer space of the nanoclay so that the expanded interlayer space of the nanoclay is further expanded due to the structure resulting from the reaction so that complete exfoliation of the nanoclay occurs, and a thermosetting expanded foam having an excellent flame retardancy produced using the expanded foam solution.

Technical Solution

As a means for achieving the above object,
an expanded foam solution for forming a foam and a thermosetting expanded foam having an excellent flame retardancy using the same according to the present disclosure are configured as follows.

The present invention provides an expanded foam solution for forming a thermosetting expanded foam having excellent flame retardancy, the expanded foam solution including: at least one polyol-based compound selected from among polyester polyol and polyether polyol; a mixture including at least one of a trimerization catalyst and an isocyanurate compound, water, a surfactant, a flame retardant, and a catalyst; and a mixture solution composed of the compound, the mixture and nanoclay and obtained by treating a nanoclay-polyol interlayer compound, which contains the nanoclay in an amount of 1 to 10 wt % based on 100 wt % of the mixture solution, with ultrasonic waves having an intensity of 200 to 3,000 W at a frequency of 20 kHz or with a high pressure of 1,000 to 3,000 bar; and a foaming agent.

The present invention also provides a thermosetting expanded foam obtained by curing the expanded foam solution with a curing agent.

More detailed, in the expanded foam solution for forming a foam and a thermosetting expanded foam having excellent flame retardancy obtained by curing the expanded foam solution, the mixture solution has a viscosity of 5,000 cps or less, the nanoclay has a water content of 0.5 to %, a true density of 1.5 to 3 g/cm$^3$ and an average particle diameter (d50) of 30 μm or less. In addition, the nanoclay-polyol interlayer compound is formed by intercalation of the compound and the mixture into the expanded interlayer space of the nanoclay and has at least one structure selected from a urethane structure, a urea structure and an isocyanurate structure, and the molecular weight and volume of the nanoclay-polyol interlayer compound increase rapidly due to the at least one structure, so that the expanded interlayer space of the nanoclay is further expanded and exfoliation of the nanoclay occurs.

More specifically, a method for producing the expanded foam solution for forming a thermosetting expanded foam having excellent flame retardancy and for producing the foam may include steps of:

a method for producing a thermosetting foam having excellent flame retardancy according to the present disclosure includes steps of:

(1) preparing a polyol-based compound mixed with a trimerization catalyst or an isocyanurate compound;

(2) preparing a mixture containing the polyol-based compound, a surfactant, a flame retardant and a catalyst;

(3) preparing a mixture solution by adding nanoclay to the mixture;

(4) applying ultrasonic waves or high pressure to the mixture solution to expand the interlayer space of the nanoclay and to allow the mixture in the mixture solution to be intercalated into the expanded interlayer space of the nanoclay;

(5) adding a foaming agent to the mixture resulting from step (4);

(6) adding an isocyanate-based compound to the mixture resulting from step (5);

(7) subjecting the polyol-based compound and the isocyanate-based compound to an in-situ chain reaction in the expanded interlayer space of the nanoclay; and (8) allowing exfoliation of the nanoclay to occur by further expansion of the expanded interlayer space of the nanoclay through rapid increases in molecular weight and volume due to a urethane structure, a urea structure and an isocyanurate structure, which are produced as a result of step (7).

In addition, the polyol-based compound may be polyether polyol or polyester polyol.

In addition, the trimerization catalyst may include a tertiary amine, a triazine and a metal salt trimerization catalyst, the metal salt trimerization catalyst may be an alkali metal salt of an organic carboxylic acid, the organic carboxylic acid may be acetic acid or 2-ethylhexanoic acid, and the alkali metal may be potassium or sodium.

In addition, the isocyanurate compound may be at least any one selected from the group consisting of triallyl isocyanurate, tris(2,3-epoxypropyl) isocyanurate, tris(hydroxyethyl) isocyanurate, tris(2-carboxyethyl) isocyanurate, tris[3-(trimethoxy) propyl]isocyanurate, and tris [2-(3-mercaptopropionyloxy)ethyl]isocyanurate.

In addition, the nanoclay may have a water content of 0.5 to 10%, a true density of 1.5 to 3 g/cm$^3$, and an average particle diameter (d50) of 30 μm or less.

In addition, the nanoclay may be contained in an amount of 1 to 10 wt % based on 100 wt % of the mixture solution.

In addition, the nanoclay may be at least any one selected from the group consisting of montmorillonite, bentonite, hectorite, saponite, beidelite, nontronite, mica, vermiculite, carnemite, magadiite, kenyaite, kaolinite, smectite, illite, chlorite, muscovite, pyrophyllite, antigorite, sepiolite, imogolite, sobokite, nacrite, anauxite, sericite, ledikite, and combinations thereof.

In addition, the nanoclay may be at least any one selected from the group consisting of: hydrophilic nanoclay modified by substitution with an alkyl ammonium or alkyl phosphonium ion treated with a Na$^+$ ion, a Ca$^{++}$ ion or an acid or having an end hydroxyl group (—OH), in the interlayer space thereof; hydrophobic nanoclay organically modified by substitution with a hydrophobic alkyl ammonium or alkyl phosphonium ion; and a combination of the hydrophilic nanoclay and the hydrophobic nanoclay.

In addition, the nanoclay may be used in combination with CNTs.

In addition, the interlayer space of the nanoclay may include one selected from the group consisting of silane coupling agents and combinations thereof.

In addition, the silane coupling agent may be at least any one selected from the group consisting of aminopropyltrimethoxysilane, 3-(2-aminoethyl)aminopropylmethyldimethoxysilane, (3-trimethoxysilylpropyl) diethyleneamine, bis (2-hydroxyethyl)-3-aminopropyltriethoxysilane, glycidoxypropyltrimethoxysilane, and bis(trimethoxysilyl) ethane.

In addition, the mixture solution may have a viscosity of 5000 cps or less.

In addition, the ultrasonic waves that are applied in step (4) may have an intensity of 200 to 3,000 W at a frequency of 20 KHZ.

In addition, the high pressure in step (4) may be a pressure of 1000 to 3,000 bar, which is applied through a high-pressure homogenizer.

In addition, step (5) may be performed at a temperature below the boiling point of the foaming agent.

In addition, the isocyanate-based compound may be selected from among m-MDI (monomeric-methylene diisocyanate), p-MDI (polymeric-methylene diisocyanate), TDI (toluene diisocyanate), derivatives thereof or mixtures thereof.

In addition, the ratio of the weight of the isocyanate-based compound, which is added in step (6), relative to the weight of the mixture resulting from step (5), may be 0.65 to 3.0.

In addition, the thermosetting foam may have a density of 35 kg/m3 to 40 kg/m$^3$, and may be hard, soft or semi-hard foam.

In addition, after a specimen of the thermosetting foam is burned for 5 minutes according to an ISO 5660-1 test method, the specimen may be increased in height by 3 mm to 10 mm due to expansion of char, and the total weight loss thereof may not exceed 5.0 g to 6.5 g while the expanded state of the char that increased in height is maintained.

The thermosetting foam having excellent flame retardancy according to the present disclosure may be produced by any one of the methods for producing a thermosetting foam having excellent flame retardancy.

Advantageous Effects

According to the embodiments, after a specimen of the thermosetting foam having excellent flame retardancy according to the present disclosure is subjected to a burning test for 5 minutes according to ISO 5660-1, the specimen may be increased in height by 3 mm to 10 mm due to expansion of char, and the total weight loss thereof may not exceed 5.0 g to 6.5 g while the expanded state of the char that increased in height is maintained, suggesting that the thermosetting foam has excellent flame retardancy.

BRIEF DESCRIPTION OF DRAWINGS

FIGS. 7-10 are photographs showing the change in height by expansion after burning compared to before burning of each of the thermosetting foams of Comparative Examples 1 to 15.

MODE FOR INVENTION

Figure 1A:
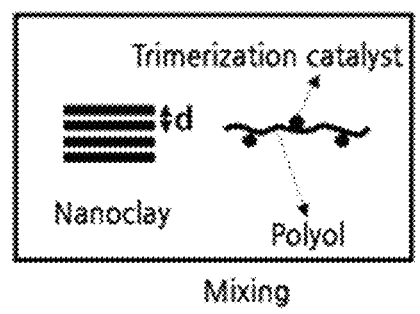
FIGS. 1A-1D are schematic views showing the mechanism by which a trimerization catalyst and a polyol are intercalated into the interlayer space of nanoclay and the nanoclay is exfoliated, in the present disclosure.

The present invention provides an expanded foam solution for forming a thermosetting expanded foam having excellent flame retardancy, the expanded foam solution including: at least one polyol-based compound selected from among polyester polyol and polyether polyol; a mixture including at least one of a trimerization catalyst and an isocyanurate compound, water, a surfactant, a flame retardant, and a catalyst; and a mixture solution composed of the compound, the mixture and nanoclay and obtained by treating a nanoclay-polyol interlayer compound, which contains the nanoclay in an amount of 1 to 10 wt % based on 100 wt % of the mixture solution, with ultrasonic waves having an intensity of 200 to 3,000 W at a frequency of 20 kHz or with a high pressure of 1,000 to 3,000 bar; and a foaming agent.

An expanded foam solution for forming a foam and an expanded foam having excellent flame retardancy using the same according to the present invention are configured as follows.

The present invention provides an expanded foam solution for forming a thermosetting expanded foam having excellent flame retardancy, the expanded foam solution including: at least one polyol-based compound selected from among polyester polyol and polyether polyol; a mixture including at least one of a trimerization catalyst and an isocyanurate compound, water, a surfactant, a flame retardant, and a catalyst; and a mixture solution composed of the compound, the mixture and nanoclay and obtained by treating a nanoclay-polyol interlayer compound, which contains the nanoclay in an amount of 1 to 10 wt % based on 100 wt % of the mixture solution, with ultrasonic waves having an intensity of 200 or 3,000 W at a frequency of 20 kHz or with a high pressure of 1,000 to 3,000 bar; and a foaming agent.

The present invention also provides a thermosetting expanded foam obtained by curing the expanded foam solution with a curing agent.

In the expanded foam solution for forming a thermosetting expanded foam having excellent flame retardancy and an expanded foam obtained by curing the expanded foam solution, the mixture solution has a viscosity of 5,000 cps or less, the nanoclay has a water content of 0.5 to 10%, a true density of 1.5 to 3 g/cm$^3$ and an average particle diameter (d50) of 30 μm or less. In addition, the nanoclay-polyol interlayer compound is formed by intercalation of the compound and the mixture into the expanded interlayer space of the nanoclay and has at least one structure selected from a urethane structure, a urea structure and an isocyanurate structure, and the molecular weight and volume of the nanoclay-polyol interlayer compound increase rapidly due to the at least one structure, so that the expanded interlayer space of the nanoclay is further expanded and exfoliation of the nanoclay occurs. Further, a thermosetting expanded foam obtained by curing the expanded foam solution with a curing agent.

The present disclosure is directed to a method for producing a thermosetting foam having excellent flame retardancy, the method including steps of: (1) preparing a polyol-based compound mixed with a trimerization catalyst or an isocyanurate compound;

(2) preparing a mixture containing the polyol-based compound, a surfactant, a flame retardant and a catalyst;

(3) preparing a mixture solution by adding nanoclay to the mixture;

(4) applying ultrasonic waves or high pressure to the mixture solution to expand the interlayer space of the nanoclay and to allow the mixture in the mixture solution to be intercalated into the expanded interlayer space of the nanoclay;

(5) adding a foaming agent to the mixture resulting from step (4);

(6) adding an isocyanate-based compound to the mixture resulting from step (5);

(7) subjecting the polyol-based compound and the isocyanate-based compound to an in-situ chain reaction in the expanded interlayer space of the nanoclay; and (8) allowing exfoliation of the nanoclay to occur by further expansion of the expanded interlayer space of the nanoclay through rapid increases in molecular weight and volume due to a urethane structure, a urea structure and an isocyanurate structure, which are produced as a result of step (7).

The method for producing a thermosetting foam having excellent flame retardancy according to the present disclosure will now be described in more detail with reference to FIGS. 1A-1D.

First, in step (1), a polyol-based compound mixed with a trimerization catalyst or an isocyanurate compound is prepared.

The polyol-based compound may be polyether polyol or polyester polyol.

The polyether polyol may be produced by polymerizing at least one selected from the group consisting of ethylene glycol, 1,2-propane glycol, 1,3-propylene glycol, butylene glycol, 1,6-hexanediol, 1,8-octanediol, neopentyl 2-methyl-1,3-propanediol, glycerol, trimethylolpropane, 1,2,3-hexanetriol, 1,2,4-butanetriol, trimethylolmethane, pentaerythritol, diethylene glycol, triethylene glycol, polyethylene glycol, tripropylene glycol, polypropylene glycol, dibutylene glycol, polybutylene glycol, sorbitol, sucrose, hydroquinone, resorcinol, catechol, and bisphenol, with ethylene oxide, propylene oxide, or a mixture thereof.

The polyester polyol may be produced by polymerizing phthalic anhydride or adipic acid with ethylene oxide, propylene oxide, or a mixture thereof.

In order to form an isocyanurate structure using the polyol-based compound of the present disclosure, a trimerization catalyst is mixed with the polyol-based compound, or an isocyanurate compound is mixed with the polyol-based compound.

The trimerization catalyst that is mixed with the polyol-based compound induces a metal salt to act as an activator so that an isocyanate compound itself participates in an isocyanurate reaction. The trimerization catalyst may be composed of a tertiary amine, a triazine and a metal salt trimerization catalyst. The metal salt trimerization catalyst may be an alkali metal salt of an organic carboxylic acid, the organic carboxylic acid in the alkali metal salt of the organic carboxylic acid may be acetic acid or 2-ethylhexanoic acid, and the alkali metal may be potassium or sodium.

The isocyanuate compound that is mixed with the polyol-based compound may be at least any one selected from among triallyl isocyanurate, tris(2,3-epoxypropyl) isocyanurate, tris(hydroxyethyl) isocyanurate, tris(2-carboxyethyl)

isocyanurate, tris [3-(trimethoxy) propyl]isocyanurate, and tris [2-(3-mercaptopropionyloxy)ethyl]isocyanurate.

In step (2), a mixture is prepared by mixing a surfactant, a flame retardant, a catalyst and water with the polyol-based compound mixed with the trimerization catalyst or the isocyanurate compound, prepared in step (1).

The surfactant serves to control the surface tension of foam cells during cell formation, thereby preventing the size of the foam cells from excessively increasing and stabilizing the formation of the foam cells. Surfactants are divided into a silicone-based surfactant and a non-silicone-based surfactant. The silicone-based surfactant may be a silicone-based copolymer or any compound containing or combined with the same, and the non-silicone-based surfactant may be dinonyl phenol, methyl glucoside, methyl propanediol, vinyl ether maleic acid, vegetable oil, or any surfactant containing or combined with the same.

The flame retardant may be at least one selected from the group consisting of a phosphorus-based flame retardant, a metal hydrate-based flame retardant, a halogen-based flame retardant, an inorganic flame retardant, a flame retardant aid, and mixtures thereof. The phosphorus-based flame retardant includes at least one selected from the group consisting of triphenyl phosphate, cresyl diphenyl phosphate, isopropylphenyl diphenyl phosphate, and mixtures thereof. In addition, the halogen-based flame retardant includes decabromodiphenyl oxide or octabromodiphenyl oxide, and the flame retardant aid includes antimony trioxide.

The catalyst serves to control the reaction time, and may be at least one selected from the group consisting of dimethylethanolamine (DMEA), dimethylcyclohexylamine (DMCHA), pentamethylenediethylene triamine (PMETA), tetramethylene hexyl diamine (TMHDA), and mixtures thereof.

In step (3), a mixture solution is prepared by mixing the mixture of step (2) with nanoclay (FIG. 1A).

Although the nanoclay may be used in a mixture with an isocyanate-based compound, the isocyanate-based compound reacts irreversibly even with a very small amount of moisture, and hence mixing of the isocyanate-based compound with nanoclay having hydrophilicity is not preferable because it causes the solution to deteriorate or change over time, resulting in deterioration in the properties of the final product. In addition, even if it is assumed that the nanoclay is completely dried, the nanoclay particles are aggregated by water during the drying process, and hence the dispersion efficiency of the particles in the subsequent process of applying ultrasonic waves or high pressure decreases. In fact, even if the hydrophilic nanoclay is organically modified, the original hydrophilic component of the nanoclay cannot be completely removed. For this reason, it is preferable to mix the nanoclay with the polyol-based compound-containing mixture of step (2).

The water content of the nanoclay is preferably maintained at 0.5 to 10%. The nanoclay has the property of swelling with water, and thus if the water content of the nanoclay is less than 0.5%, the nanoclay particles become difficult to disperse, due to aggregation between the particles. On the other hand, if the water content is more than 10%, the water content of the polyol-based compound that is mixed with the nanoclay increases, and the physical properties thereof change after the reaction with the isocyanate-based compound.

The true density of the nanoclay is preferably maintained at 1.5 to 3 $g/cm^3$. If the true density is less than 1.5 $g/cm^3$, the specific surface area may increase, and thus the nanoclay may easily absorb moisture, and if the true density is more than 3 $g/cm^3$, the load of the nanoclay may increase, and thus the nanoclay may precipitate even after dispersion with the polyol-based compound, resulting in a change in the physical properties thereof.

The average particle diameter (d50) of the nanoclay is preferably 30 μm or less. If the average particle diameter is larger than 30 μm, the density of the nanoclay may increase and the nanoclay may precipitate due to the load thereof.

In addition, the nanoclay may be contained in an amount of 1 to 10 wt % based on 100 wt % of the mixture solution containing the mixture and the nanoclay. If the nanoclay is contained in an amount of less than 1 wt %, the effect of improving physical properties may not be achieved, and if the nanoclay is contained in an amount of more than 10 wt %, the dispersion efficiency of the nanoclay may be lowered, resulting in deterioration in physical properties.

The nanoclay is at least any one selected from the group consisting of montmorillonite, bentonite, hectorite, saponite, beidelite, nontronite, mica, vermiculite, carnemite, magadiite, kenyaite, kaolinite, smectite, illite, chlorite, muscovite, pyrophyllite, antigorite, sepiolite, imogolite, sobokite, nacrite, anauxite, sericite, ledikite, and combinations thereof.

The nanoclay may be used after organic modification. That is, the interlayer cation of the nanoclay may be ion-exchanged with an alkyl ammonium or alkyl phosphonium ion. Depending on the nature of the ion, the nanoclay may be rendered hydrophobic or hydrophilic. The nanoclay that is used in the present disclosure may be at least any one selected from the group consisting of: hydrophilic nanoclay organically modified by substitution with an alkyl ammonium or alkyl phosphonium ion treated with a Nation, a $Ca^{++}$ ion or an acid or having an end hydroxyl group (—OH), in the interlayer space thereof; hydrophobic nanoclay organically modified by substitution with a hydrophobic alkyl ammonium or alkyl phosphonium ion; and a combination of the hydrophilic nanoclay and the hydrophobic nanoclay.

The nanoclay may be used in combination with carbon nanotubes CNTs. When the CNTs are combined with the nanoclay, they have the effects of increasing the dispersibility of the nanoclay in the polyol resin and increasing heat insulation performance by making cells uniform during foaming. However, the type and content of the CNTs are not particularly limited.

Mixing of the nanoclay and the mixture is preferably performed under a temperature of 20 to 40° C. and a stirring speed of 50 to 700 rpm for 30 minutes to 3 hours, without being limited thereto.

The mixture solution in step (3) preferably has a viscosity of 5,000 cps or less. If the viscosity is more than 5,000 cps, a problem may arise in that the dispersion efficiency in the subsequent dispersion process performed using ultrasonic waves or high pressure is lowered.

Figure 1B:
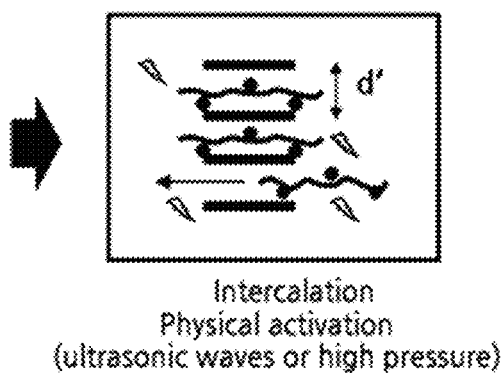

In step (4), ultrasonic waves or high pressure is applied to the mixture solution of step (3), so that the interlayer space of the nanoclay is expanded and the mixture is intercalated into the expanded interlayer space of the nanoclay (FIG. 1B).

At this time, one selected from the group consisting of silane coupling agents and combinations thereof may be added. The silane coupling agent is an organic-inorganic intermediate that acts to facilitate intercalation of the mixture into the expanded layer space of the nanoclay by overcoming the incompatibility between the mixture having organic properties and the nanoclay having inorganic properties. In addition, the silane coupling agent may be mixed in advance in step (3). However, in the present disclosure, the content of the silane coupling agent is not limited.

The silane coupling agent may be at least any one selected from the group consisting of aminopropyltrimethoxysilane, 3-(2-aminoethyl)aminopropylmethyldimethoxysilane, (3-trimethoxysilylpropyl) diethyleneamine, bis(2-hydroxyethyl)-3-aminopropyltriethoxysilane, glycidoxypropyltrimethoxysilane, and bis(trimethoxysilyl) ethane.

After the preparation of the mixed solution is completed, application of ultrasonic waves or high pressure is performed.

The intensity of ultrasonic waves for dispersing the mixture into the interlayer space of the nanoclay through dispersion is preferably 200 to 3,000 W at 20 KHZ. If the intensity is lower than 200 W, the efficiency of dispersion is lowered, and if the intensity is higher than 3,000 W, a problem arises in that physical properties are degraded due to damage to the nanoclay. The flow rate of the mixture solution to which ultrasonic waves may be applied may be 100 ml/min to 20 L/min without being limited thereto, and may be controlled depending on the intensity of the ultrasonic waves for dispersion. When ultrasonic waves are applied, the temperature of the nanoclay and the polyol-based compound may increase due to vibration and friction. Thus, the temperature is preferably controlled at 15 to 80° C. If the temperature is lower than 15° C., a problem arises in that the efficiency of dispersion is lowered, and if the temperature is higher than 80° C., a problem arises in that a portion of the components is undesirably vaporized.

High pressure for intercalating the mixture into the interlayer space of the nanoclay through dispersion is applied through a high-pressure homogenizer. The high-pressure homogenizer is a system that induces dispersion of a fluid in a chamber having a certain size by applying high pressure to the fluid. In the present disclosure, a high pressure of 1000 to 3,000 bar is applied through the high-pressure homogenizer. If the high pressure is lower than 1,000 bar, the efficiency of dispersion is lowered, resulting in degradation in physical properties, and if the high pressure is higher than 3,000 bar, physical properties are degraded due to damage to the nanoclay. The smooth intercalation of the components of the mixture into the interlayer space of the nanoclay layers may be confirmed through measurement of physical properties.

Assuming that the distance of interlayer spacing of naturally occurring or organically modified nanoclay is d, expansion of the interlayer space of the nanoclay occurs due to vibration, shock, or pressure during application of ultrasonic waves or high pressure, and at this time, the components of the mixture are intercalated into the expanded interlayer space of the nanoclay. After completion of the intercalation of the mixture into the interlayer space of the nanoclay, aggregation between the nanoclay layers does not occur even if ultrasonic waves are no longer applied. Assuming that the distance of interlayer spacing of the nanoclay after the application of ultrasonic waves or high pressure as described above is d', d' is greater than d (d<d'), which indicates that the interlayer space of the nanoclay has been expanded.

In step (5), a foaming agent is added. If the foaming agent is added prior to the dispersion process performed using ultrasonic waves or high pressure, a problem arises in that the foaming agent is vaporized by heat due to vibration and friction or pressure. The step of adding the foaming agent is preferably performed at a temperature below the boiling point of the foaming agent. If the temperature is higher than the boiling temperature of the foaming agent, a problem may also arise in that the foaming agent is vaporized. The foaming agent is preferably a material having low thermal conductivity and high stability. Specifically, the foaming agent may be at least any one selected from the group consisting of cyclopentane, chlorofluorocarbon, isopentane, n-pentane, hydrochlorofluorocarbon, hydrofluorocarbon, and water.

In step (6), an isocyanate-based compound is added. After the isocyanate-based compound is added and mixed, the resulting mixture may be injected into a mold having a certain size in a high-pressure foaming machine or a low-pressure foaming machine, or may be sprayed onto an adherend surface through a mixing gun. A foaming system may include various systems such as Graco, Gusmer, and Gras-craft. While a discharge pressure of 50 to 200 bar and a temperature 30 to 70° C. are maintained, the polyol-based compound and the isocyanate-based compound may be activated chemically according to a mechanism caused by collision and mixing thereof and may be sprayed.

The isocyanate-based compound may be, but is not particularly limited to, at least one selected from among m-MDI (monomeric-methylene diisocyanate), p-MDI (polymeric-methylene diisocyanate), TDI (toluene diisocyanate), derivatives thereof or mixtures thereof.

Figure 1D:
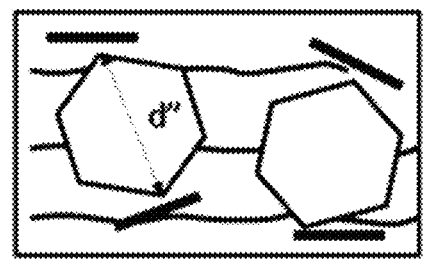
Figure 1C:
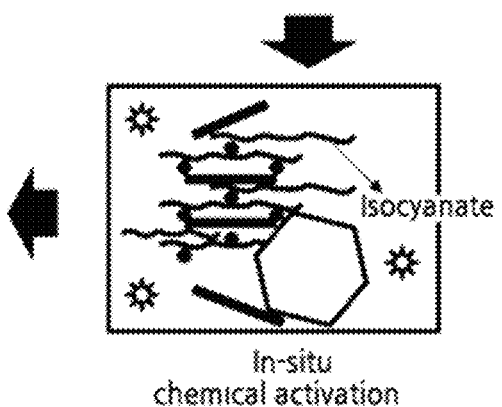
Figure 3:
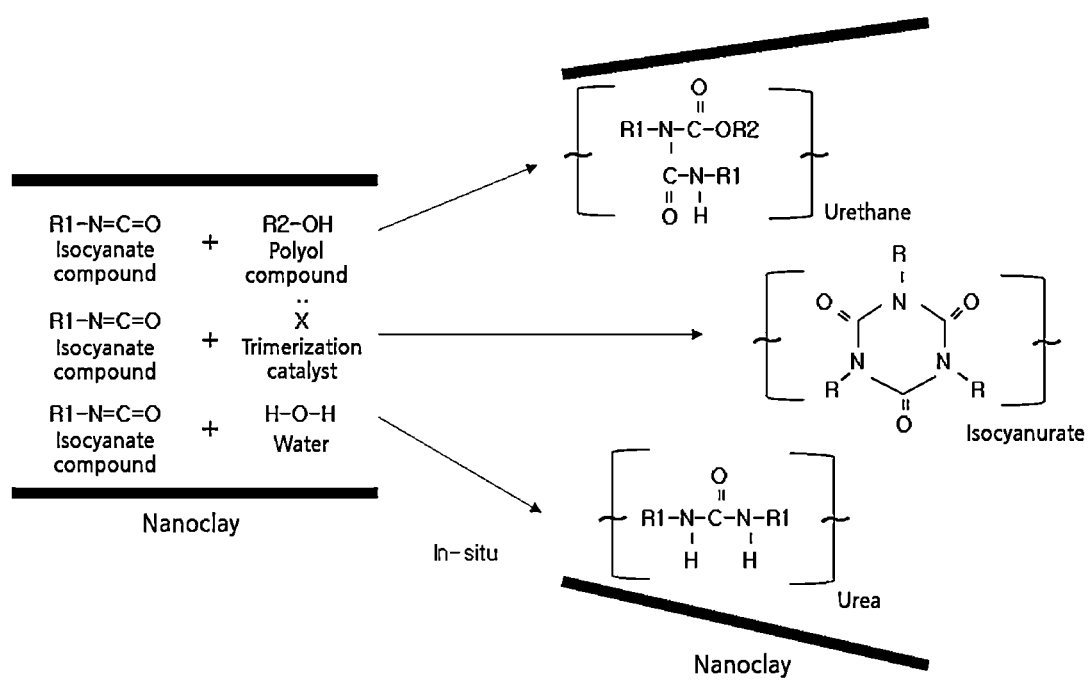
FIG. 3 is a view showing an in-situ chain reaction mechanism in the production of the thermosetting foam according to the present disclosure.

When the isocyanate-based compound moves to the polyol-based compound intercalated into the interlayer space of the nanoclay, an in-situ chain reaction occurs in which a urethane reaction, a urea reaction and an isocyanurate reaction caused by the trimerization catalyst simultaneously occur as shown in FIG. 3 (FIG. 1C). The in-situ chain reaction is step (7) of the present disclosure.

The ratio of the weight of the isocyanate-based compound, which is added in step (6), relative to the weight of the mixture resulting from step (5), is 0.65 to 3.0. If the ratio of the weight is less than 0.65 or more than 3.0, a problem arises in that physical properties such as strength or flame retardancy are degraded rapidly.

In step (8), the produced urethane structure, urea structure and isocyanurate structure contribute to complete exfoliation of the nanoclay layers by further expanding the distance of expanded interlayer space of the nanoclay through rapid increases in the molecular weight and volume of the reaction product formed in the interlayer space (FIG. 1D).

The thermosetting foam produced as described above has a density of 35 kg/m$^3$ to 40 kg/m$^3$ while having excellent flame retardancy. After a specimen of the thermosetting foam is burned for 5 minutes according to an ISO 5660-1 test method, the specimen is increased in height by 3 mm to 10 mm due to expansion of char, and the total weight loss thereof does not exceed 5.0 g to 6.5 g while the expanded state of the char that increased in height is maintained. The volume of conventional foam generally decreases after burning, but the thermosetting foamed foam of the present disclosure expands in volume during burning, and thus may be maintained in an airtight state, thereby exhibiting better flame retardant performance. Furthermore, the polyurethane foam itself has very excellent flame retardancy and semi-non-flammable performance, even when an additional material that improves flame retardancy, such as an iron plate or a silver foil, is not attached to the outer surface of the polyurethane foam.

However, if the nanoclay is not completely dispersed in the mixture, unlike the present disclosure, the density of the thermosetting foam may exceed 40 kg/m$^3$. In addition, after a specimen of the thermosetting foam is burned for 5 minutes according to an ISO 5660-1 test method, the specimen does not increase in height by 3 mm or more, and the total weight loss thereof exceeds 6.5 g.

The thermoplastic foam produced according to the present disclosure may be hard, soft or semi-hard foam having a density of 40 kg/m³ or less.

Figure 2:
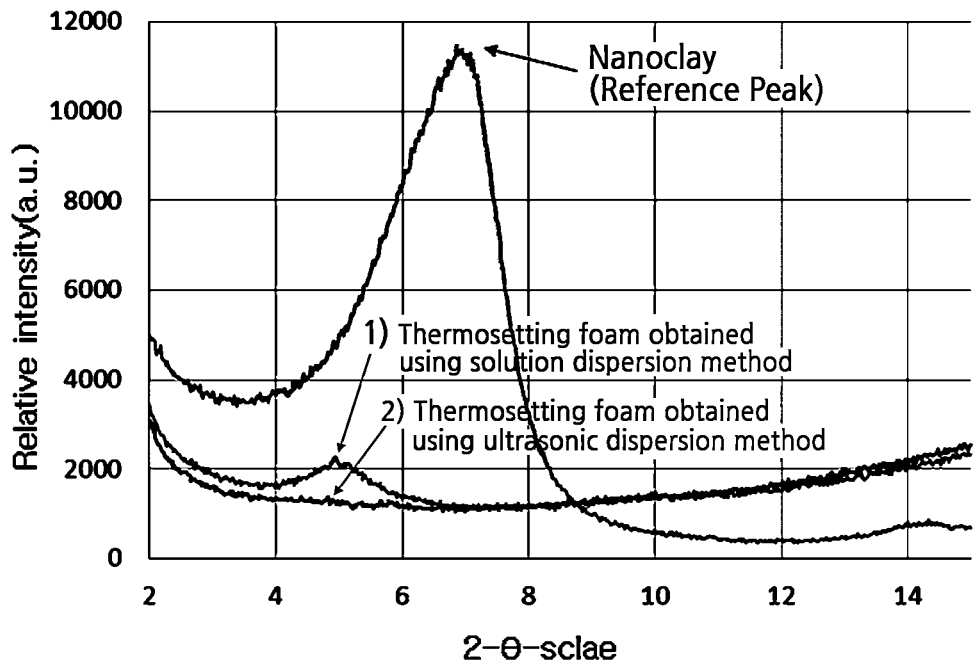
FIG. 2 is a graph showing the X-ray diffraction pattern of a thermosetting foam according to the present disclosure.

For the thermosetting foam produced as described above, an exfoliated state obtained by expanding the distance of interlayer space of the nanoclay could be analyzed using an X-ray diffraction analyzer, and the results of the analysis are shown in FIG. 2. The distance of interlayer spacing of the nanoclay may be calculated by the Bragg's law equation using the non-expanded interlayer spacing of the nanoclay as a reference. The foam produced using the solution dispersion method is indicated as curve 1 in FIG. 2, and the foam produced using the ultrasonic dispersion method is indicated as curve 2 in FIG. 2.

$$2d \sin \theta = n\lambda \text{ (Bragg's law)}$$

wherein d: distance between crystal planes (nanoclay layers), 0: angle between incident X-ray and crystal plane, and λ: X-ray wavelength In general, the 2θ value of the X-ray diffraction peak represents the interlayer spacing of the nanoclay. As the 2θ value decreases, the interlayer spacing increases, and when complete exfoliation occurs, the peak disappears. Thus, it can be seen through FIG. 2 that, in the production of the thermosetting foam according to the present disclosure, the components of the mixture were first intercalated between the nanoclay layers by an ultrasonic dispersion method, and the nanoclay layers were completely exfoliated during the in-situ chain reaction performed using the trimerization catalyst and the isocyanate-based compound.

Figure 4:
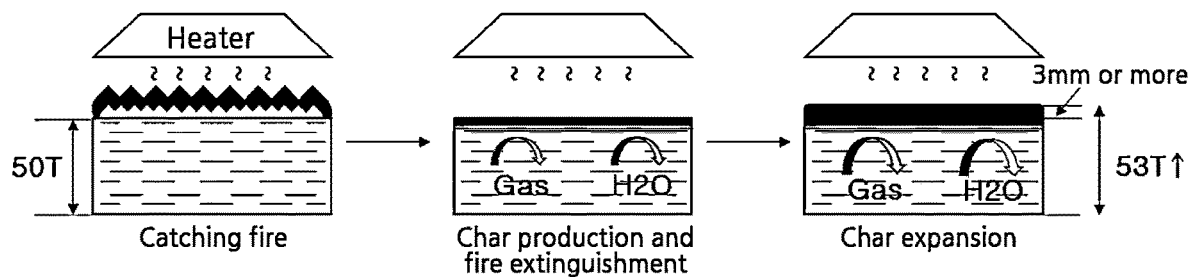
FIG. 4 is a view showing that the height of the thermoplastic foam according to the present disclosure is increased due to expansion after the start of burning.

The mechanism of burning of the thermosetting foam is shown in FIG. 4. As shown therein, nanoclay is dispersed as lamellae and serves as a barrier that blocks flame and heat during burning. When burning starts, char is formed on the surface of the foam. At this time, the generated gas and water are trapped by the nanoclay, and the amount of gas and water generated further increases over time. Eventually, a phenomenon appears in which the char expands. The flame is extinguished, and the expanded char increases in height by 3 mm or more while maximizing the heat shielding effect. Finally, the flame retardancy is further increased, and the final weight loss measured by the test method is 6.5 g or less.

Hereinafter, the present disclosure will be described in detail with reference to specific examples and comparative examples. These examples serve merely to illustrate the present disclosure, and should not be construed as limiting the scope of the present disclosure.

Table 1 below shows the composition ratio and dispersion method used in each example, and Tables 2 and 3 below show the composition ratio and dispersion method used in each comparative example.

Example 1

For production of a polyol-based compound containing nanoclay, 80 wt % of a polyester polyol, 20 wt % of a polyether polyol, 1.5 wt % of water, 0.7 wt % of a surfactant, 20 wt % of a phosphorus-based flame retardant, 0.15 wt % of a catalyst, 2.3 wt % of a trimerization catalyst, and 3 wt % of nanoclay were introduced and stirred under the conditions of 25° C. and 150 rpm for 30 min. After completion of the stirring, the solution was passed through a continuous ultrasonic system at a flow rate of 6 L/min while the nanoclay was dispersed by applying ultrasonic waves having an intensity of 1,500 W at a frequency of 20 kHz, and the solution was discharged. To the polyol-based compound in which the nanoclay was completely dispersed, 15 wt % of a foaming agent (HCFC-141B) was added, and the mixture was stirred at 100 rpm for 10 minutes and placed in container B of a foaming machine. An isocyanate-based compound was placed in container A of the foaming machine. The solutions in containers A and B of the foaming machine were discharged into a mold at a ratio of 120:100 (A:B), thereby producing thermosetting foam. At this time, the temperature of the solutions in containers A and B was 50° C., and the discharge pressure was 100 bar.

Example 2

Thermosetting foam was produced in the same manner as in Example 1, except that the nanoclay was used in an amount of 5 wt %.

Example 3

Thermosetting foam was produced in the same manner as in Example 2, except that the trimerization catalyst was excluded from the composition of Example 2, the isocyanurate compound was added in an amount of 3 wt %, and the ratio of the solutions in containers A and B of the foaming machine was 100:100.

Example 4

Thermosetting foam was produced in the same manner as in Example 2, except that the isocyanurate compound in the composition of Example 2 was added in an amount of 3 wt %.

Example 5

Thermosetting foam was produced in the same manner as in Example 1, except that the polyol-based compound containing nanoclay was dispersed at a high pressure of 1,500 bar in a high-pressure homogenizer instead of the ultrasonic dispersion method.

Example 6

Thermosetting foam was produced in the same manner as in Example 2, except that the polyol-based compound containing nanoclay was dispersed at a high pressure of 1,500 bar in a high-pressure homogenizer instead of the ultrasonic dispersion method.

Example 7

For production of a polyol-based compound containing nanoclay, 80 wt % of a polyester polyol, 20 wt % of a polyether polyol, 1 wt % of water, 1.2 wt % of a surfactant, 20 wt % of a phosphorus-based flame retardant, 0.7 wt % of a catalyst, 3.8 wt % of a trimerization catalyst, and 3 wt % of nanoclay were introduced and stirred under the conditions of 25° C. and 150 rpm for 30 min. After completion of the stirring, the solution was passed through a continuous ultrasonic system at a flow rate of 6 L/min while the nanoclay was dispersed by applying ultrasonic waves with an intensity of 1,500 W at a frequency of 20 kHz, and the solution was discharged. To the polyol-based compound in which the nanoclay was completely dispersed, 23 wt % of a foaming agent (HCFC-141B) was added, and the mixture was stirred at 100 rpm for 10 minutes and placed in container B of a foaming machine. An isocyanate-based compound was placed in container A of the foaming machine. The solutions in containers A and B of the foaming machine were discharged into a mold at a ratio of 200:100 (A:B), thereby producing thermosetting foam. At this time, the temperature of the solutions in containers A and B was 50° C., and the discharge pressure was 100 bar.

Example 8

Thermosetting foam was produced in the same manner as in Example 7, except that the nanoclay was used in an amount of 5 wt %.

Comparative Example 1

For production of a polyol-based compound containing nanoclay, 80 wt % of a polyester polyol, 20 wt % of a polyether polyol, 1.5 wt % of water, 0.7 wt % of a surfactant, 20 wt % of a phosphorus-based flame retardant, 0.15 wt % of a catalyst, 2.3 wt % of a trimerization catalyst, and 3 wt % of nanoclay were introduced and stirred under the conditions of 25° C. and 150 rpm for 30 min. After completion of the stirring, the solution was stirred with a high-speed stirrer at 500 rpm for 10 minutes and discharged. To the polyol-based compound in which the nanoclay was completely dispersed, 15 wt % of a foaming agent (HCFC-141B) was added, and the mixture was stirred at 100 rpm for 10 minutes and placed in container B of a foaming machine. An isocyanate-based compound was placed in container A of the foaming machine. The solutions in containers A and B of the foaming machine were discharged into a mold at a ratio of 120:100 (A:B), thereby producing thermosetting foam. At this time, the temperature of the solutions in containers A and B was 50° C., and the discharge pressure was 100 bar.

Comparative Example 2

Thermosetting foam was produced in the same manner as in Comparative Example 1, except that dispersion of the polyol-based compound containing nanoclay was performed with a high-speed stirrer at 5,000 rpm for 10 minutes.

Comparative Example 3

Thermosetting foam was produced in the same manner as in Comparative Example 1, except that dispersion of the polyol-based compound containing nanoclay was performed with a high-speed stirrer at 5,000 rpm for 30 minutes.

Comparative Example 4

Thermosetting foam was produced in the same manner as in Comparative Example 1, except that dispersion of the polyol-based compound containing nanoclay was performed with a high-speed stirrer at 8,000 rpm for 30 minutes.

Comparative Example 5

Thermosetting foam was produced in the same manner as in Comparative Example 1, except that a solution containing no nanoclay in the composition of the polyol-based compound of Comparative Example 1 was prepared, and separate dispersion was not performed because the solution contained no nanoclay.

Comparative Example 6

For production of a polyol-based compound, 80 wt % of a polyester polyol, 20 wt % of a polyether polyol, 1 wt % of water, 1.2 wt % of a surfactant, 20 wt % of a phosphorus-based flame retardant, 0.7 wt % of a catalyst, and 3.8 wt % of a trimerization catalyst were introduced and stirred under the conditions of 25° C. and 150 rpm for 30 min. Thereafter, 23 wt % of a foaming agent (HCFC-141B) was added to the polyol-based compound, and the mixture solution was stirred at 100 rpm for 10 minutes and placed in container B of a foaming machine. An isocyanate-based compound was placed in container A of the foaming machine. The solutions in containers A and B of the foaming machine were discharged into a mold at a ratio of 200:100 (A:B), thereby producing thermosetting foam. At this time, the temperature of the solutions in containers A and B was 50° C., and the discharge pressure was 100 bar.

Comparative Example 7

For production of a polyol-based compound, 80 wt % of a polyester polyol, 20 wt % of a polyether polyol, 1 wt % of water, 1.2 wt % of a surfactant, 20 wt % of a phosphorus-based flame retardant, 0.7 wt % of a catalyst, and 3.8 wt % of a trimerization catalyst were introduced and stirred under the conditions of 25° C. and 150 rpm for 30 min. Thereafter, 23 wt % of a foaming agent (HCFC-141B) was added to the polyol-based compound, and the mixture solution was stirred at 100 rpm for 10 minutes and placed in container B of a foaming machine. An isocyanate-based compound was placed in container A of the foaming machine. Here, the isocyanate-based compound contained 5 wt % of nanoclay, and the mixture solution containing the same was stirred with a high-speed stirrer at 5,000 rpm for 10 minutes. The solutions in containers A and B of the foaming machine were discharged into a mold at a ratio of 200:100 (A:B), thereby producing thermosetting foam. At this time, the temperature of the solutions in containers A and B was 50° C., and the discharge pressure was 100 bar.

Comparative Example 8

Thermosetting foam was produced in the same manner as in Comparative Example 7, except that the mixture solution containing the isocyanate-based compound containing 5 wt % of nanoclay in Comparative Example 7 was stirred with a high-speed stirrer at 5,000 rpm for 30 minutes.

Comparative Example 9

Thermosetting foam was produced in the same manner as in Comparative Example 7, except that the mixture solution containing the isocyanate-based compound containing 5 wt % of nanoclay in Comparative Example 7 was stirred with a high-speed stirrer at 10,000 rpm for 30 minutes.

Comparative Example 10

Thermosetting foam was produced in the same manner as in Comparative Example 7, except that the mixture solution containing the isocyanate-based compound containing 5 wt % of nanoclay in Comparative Example 7 was passed through a continuous ultrasonic system at a flow rate of 6 L/min while the nanoclay was dispersed by applying ultrasonic waves having an intensity of 1,500 W at a frequency of 20 KHz.

Comparative Example 11

Thermosetting foam was produced in the same manner as in Comparative Example 7, except that the mixture solution containing the polyol-based compound and the isocyanate-based compound, each containing 2.5 wt % of nanoclay, in Comparative Example 7, was passed through a continuous ultrasonic system at a flow rate of 6 L/min while the nanoclay was dispersed by applying ultrasonic waves having an intensity of 1,500 W at a frequency of 20 KHz.

Comparative Example 12

Thermosetting foam was produced in the same manner as in Comparative Example 1, except that the trimerization catalyst was excluded from the composition of the polyol-based compound of Comparative Example 1.

Comparative Example 13

Thermosetting foam was produced in the same manner as in Comparative. Example 1, except that the composition of the polyol-based compound of Comparative Example 1 contained 3 wt % of an inorganic expansion agent instead of the nanoclay.

Comparative Example 14

Thermosetting foam was produced in the same manner as in Comparative Example 5, except that the composition of the polyol-based compound of Comparative Example 5 contained 3 wt % of an inorganic expansion agent instead of the nanoclay.

Comparative Example 15

Thermosetting foam was produced in the same manner as in Comparative Example 5, except that the composition of the polyol-based compound of Comparative Example 5 contained 3 wt % of an organic expansion agent instead of the nanoclay.

TABLE 1

| | | | Example 1 | Example 2 | Example 3 | Example 4 | Example 5 | Example 6 | Example 7 | Example 8 |
|---|---|---|---|---|---|---|---|---|---|---|
| Composition | Polyol-based compound (containing foaming agent and nanoclay) | Polyester polyol | 80 | 80 | 80 | 80 | 80 | 80 | 80 | 80 |
| | | Polyether polyol | 20 | 20 | 20 | 20 | 20 | 20 | 20 | 20 |
| | | Water | 1.5 | 1.5 | 1.5 | 1.5 | 1.5 | 1.5 | 1 | 1 |
| | | Foaming agent (HCFC141B) | 15 | 15 | 15 | 15 | 15 | 15 | 23 | 23 |
| | | Surfactant | 0.7 | 0.7 | 0.7 | 0.7 | 0.7 | 0.7 | 1.2 | 1.2 |
| | | Phosphorus based flame retardant | 20 | 20 | 20 | 20 | 20 | 20 | 20 | 20 |
| | | Catalyst | 0.15 | 0.15 | 0.15 | 0.15 | 0.15 | 0.15 | 0.7 | 0.7 |
| | | Trimerization catalyst | 2.3 | 2.3 | 0 | 2.3 | 2.3 | 2.3 | 3.8 | 3.8 |
| | | Isocyanurate | 0 | 0 | 3 | 3 | 0 | 0 | 0 | 0 |
| | | Nanocaly | 3 | 5 | 5 | 5 | 3 | 5 | 3 | 5 |
| | Mixing ratio of isocyanurate-based compound (relative to 100 wt % of polyol-based compound containing foaming agent and nanoclay) | | 120 | 120 | 100 | 120 | 120 | 120 | 200 | 200 |
| | Method for dispersing nanoclay | | Ultrasonic | Ultrasonic | Ultrasonic | Ultrasonic | High pressure dispersion | High pressure dispersion | Ultrasonic | Ultrasonic |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Composition | Polyol-based compound (containing foaming agent and nanoclay) | Polyester polyol | 80 | 80 | 80 | 80 | 80 | 80 | 80 |
| | | Polyether polyol | 20 | 20 | 20 | 20 | 20 | 20 | 20 |
| | | Water | 1.5 | 1.5 | 1.5 | 1.5 | 1.5 | 1 | 1.5 |
| | | Foaming agent (HCFC141B) | 15 | 15 | 15 | 15 | 15 | 23 | 15 |
| | | Surfactant | 0.7 | 0.7 | 0.7 | 0.7 | 0.7 | 1.2 | 0.7 |
| | | Phosphorus based flame retardant | 20 | 20 | 20 | 20 | 20 | 20 | 20 |
| | | Catalyst | 0.15 | 0.15 | 0.15 | 0.15 | 0.15 | 0.7 | 0.15 |
| | | Trimerization catalyst | 2.3 | 2.3 | 2.3 | 2.3 | 2.3 | 3.8 | 2.3 |

TABLE 2-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | Isocyanurate | 0 | 0 | 0 | 0 | 0 | 0 | 0 |
|  | Nanocaly | 5 | 5 | 5 | 5 | 0 | 0 | 0 |
| Mixing ratio of isocyanurate-based compound (relative to 100 wt % of polyol-based compound containing foaming agent and nanoclay) |  | 120 | 120 | 120 | 120 | 120 | 200 | 120 |
| Nanoclay (dispersion of nanoclay mixed with isocyanurate based compound) |  | 0 | 0 | 0 | 0 | 0 | 0 | 5 |
| Method for dispersing nanoclay |  | Solution dispersion 500 RPM_10 min | Solution dispersion 5,000 RPM_10 min | Solution dispersion 5,000 RPM_30 min | Solution dispersion 10,000 RPM_30 min | — | — | Solution dispersion 5,000 RPM_10 min |

TABLE 3

|  |  |  | Comparative Example 8 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|---|
| Composition | Polyol-based compound (containing foaming agent and nanoclay) | Polyester polyol | 80 | 80 | 80 | 80 | 80 | 80 | 80 | 80 |
|  |  | Polyether polyol | 20 | 20 | 20 | 20 | 20 | 20 | 20 | 20 |
|  |  | Water | 1.5 | 1.5 | 1.5 | 1.5 | 1.5 | 1.5 | 1.5 | 1.5 |
|  |  | Foaming agent (HCFC141B) | 15 | 15 | 15 | 15 | 15 | 15 | 15 | 15 |
|  |  | Surfactant | 0.7 | 0.7 | 0.7 | 0.7 | 0.7 | 0.7 | 0.7 | 0.7 |
|  |  | Phosphorus based flame retardant | 20 | 20 | 20 | 20 | 20 | 20 | 20 | 20 |
|  |  | Catalyst | 0.15 | 0.15 | 0.15 | 0.15 | 0.15 | 0.15 | 0.15 | 0.15 |
|  |  | Trimerization catalyst | 2.3 | 2.3 | 2.3 | 2.3 | 0 | 2.3 | 2.3 | 2.3 |
|  |  | Isocyanurate | 0 | 0 | 0 | 0 | 0 | 0 | 0 | 0 |
|  |  | Nanocaly | 0 | 0 | 0 | 2.5 | 5 | 3 (inorganic expansion agent) | 3 (inorganic expansion agent) | 3 (inorganic expansion agent) |
| Mixing ratio of isocyanurate-based compound (relative to 100 wt % of polyol-based compound containing foaming agent and nanoclay) |  |  | 120 | 120 | 120 | 120 | 100 | 120 | 120 | 120 |
| Nanoclay (dispersion of nanoclay mixed with isocyanurate based compound) |  |  | 5 | 5 | 5 | 2.5 | 0 | 0 | 0 | 0 |
| Method for dispersing nanoclay |  |  | Solution dispersion 5,000 RPM_30 min | Solution dispersion 10,000 RPM_30 min | Ultrasonic | Ultrasonic | Ultrasonic | Ultrasonic | — | — |

Test 1

The densities of the thermosetting foams of the Examples according to the present disclosure and the Comparative Examples were measured according to ISO 845.

Test 2

The self-extinguishing time and weight loss of each of the thermosetting foams of the Examples according to the present disclosure and the Comparative Examples were measured according to an ISO 5660-1 burning test. For measurement of the weight loss, the weight loss of each specimen after 5 minutes of burning compared to before the burning test was measured. The specimen size was 100*100*50T, and each specimen was composed of only a single material without including a cotton material.

Test 3

The thermal conductivity of each of the thermosetting foams of the Examples according to the present disclosure and the Comparative Examples was measured according to ASTM C 518.

Test 4

The increase in height after burning of each of the thermosetting foams of the Examples according to the present disclosure and the Comparative Examples was measured as follows. In addition, the shapes of these thermosetting foams before and after burning can be seen in FIG. 4 and FIGS. 5-10.

Figure 5:
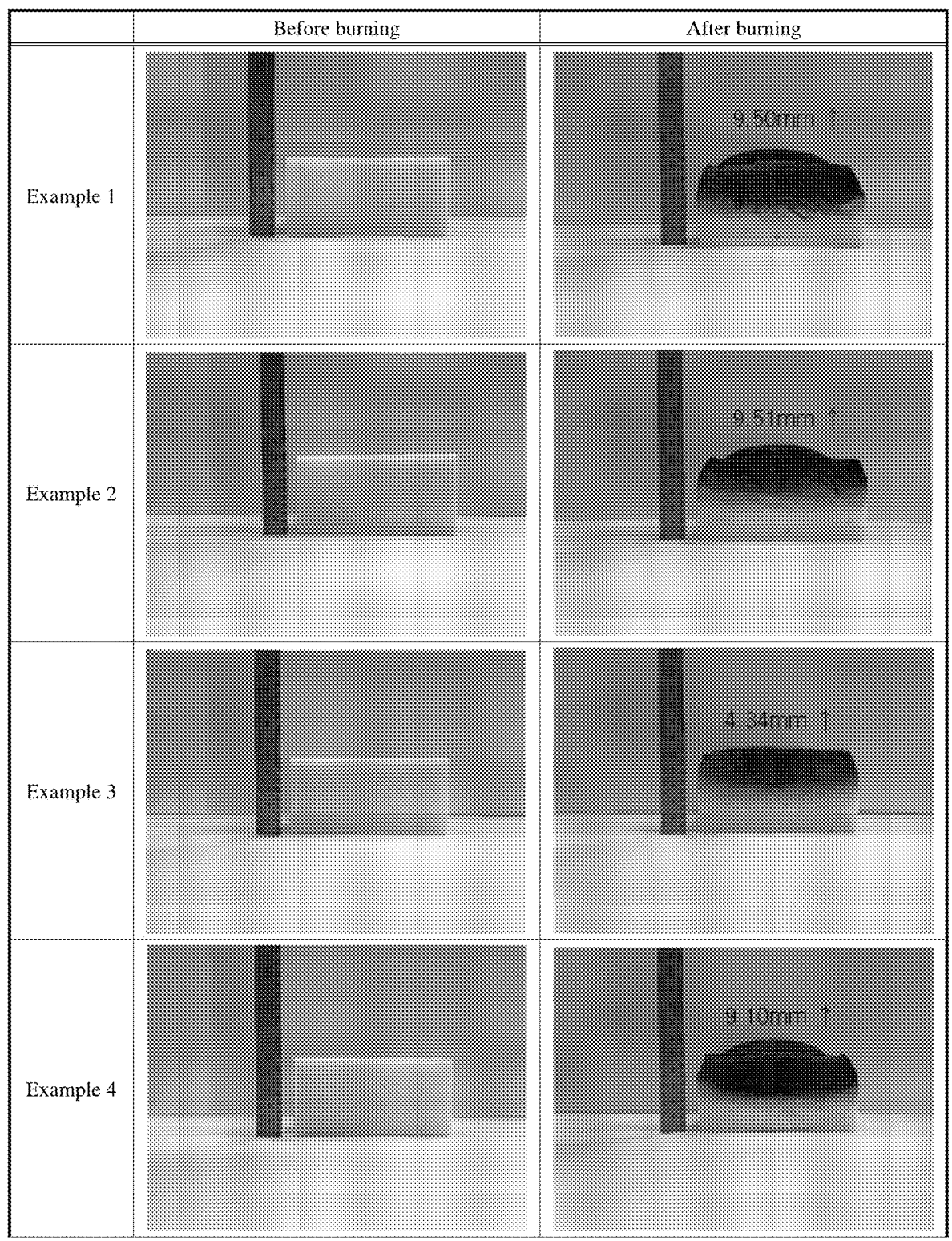
FIGS. 5-6 are photographs showing the change in height by expansion after burning compared to before burning of each of the thermosetting foams of Examples 1 to 8.
Figure 6:
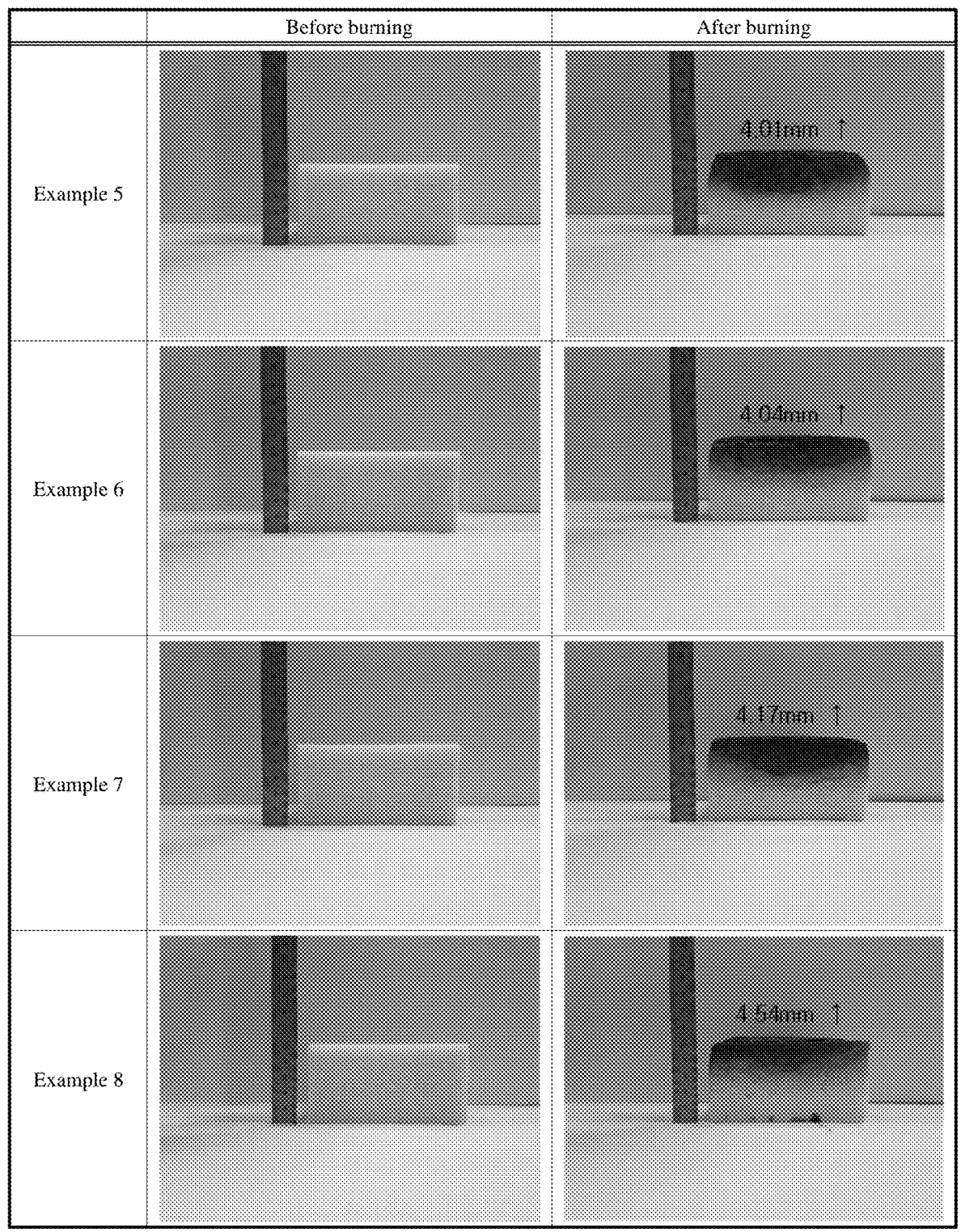
Figure 7:
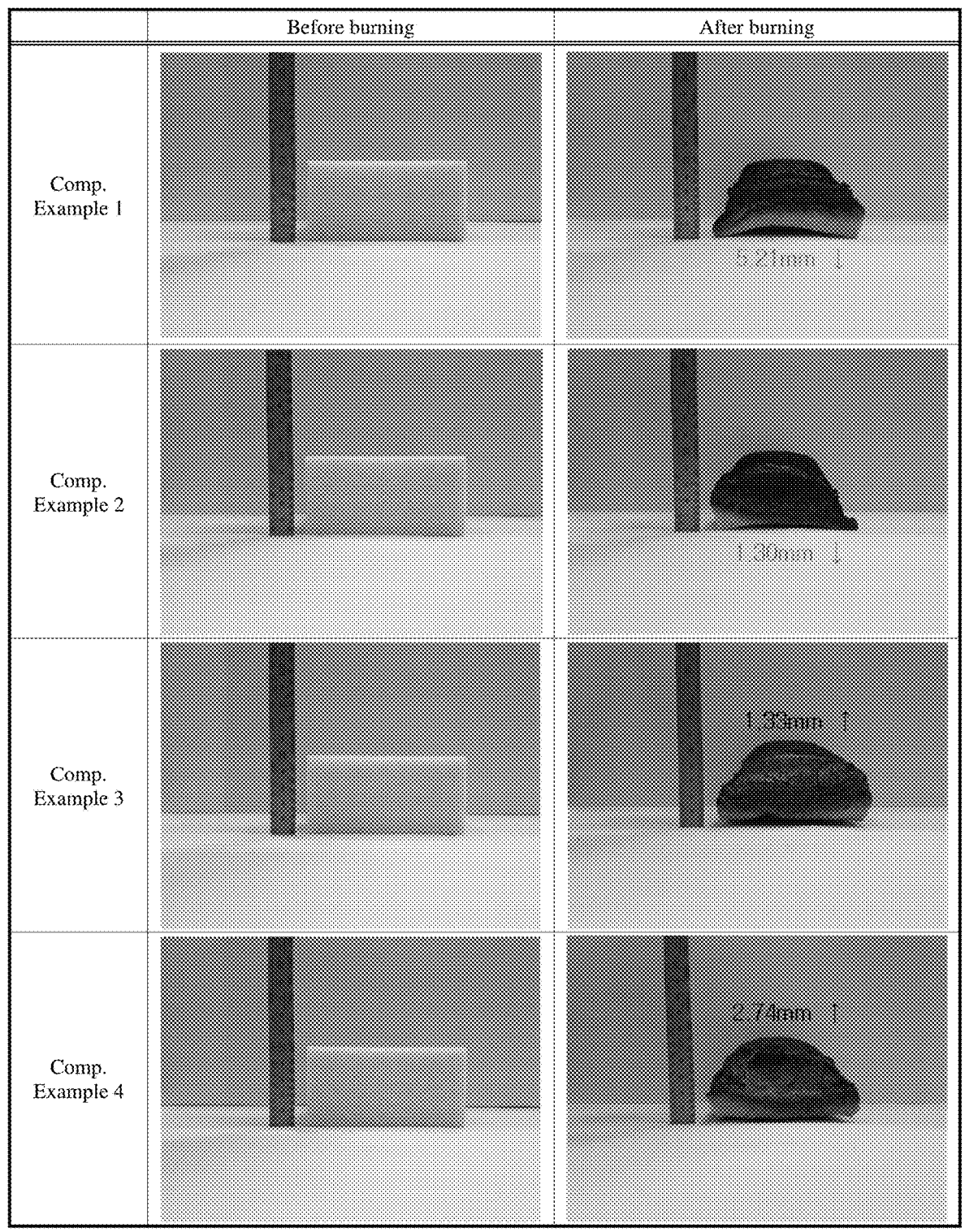
Figure 8:
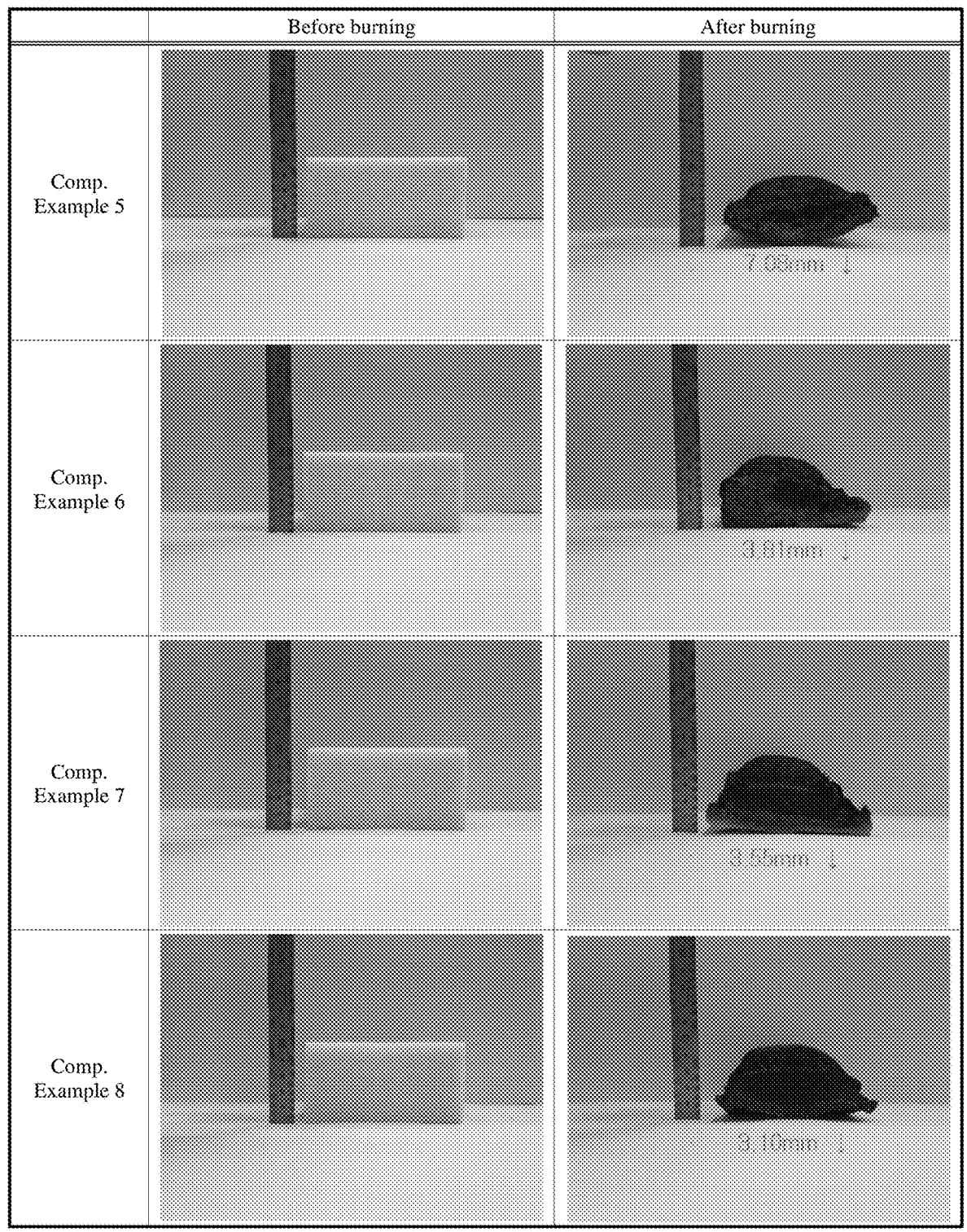
Figure 10:
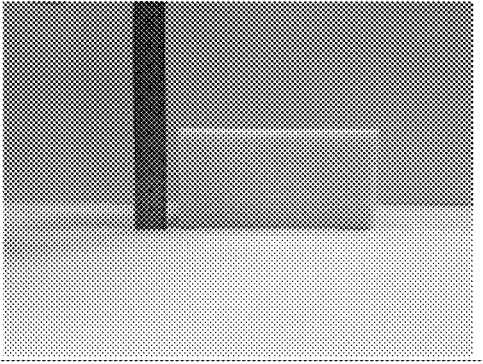

Increase (mm) in height after burning=specimen height (mm) after burning-specimen height (mm) before burning FIGS. 5-6 are photographs showing the change in height by expansion after burning compared to before burning of each of the thermosetting foams of Examples 1 to 8, and FIGS. 7-10 are photographs showing the change in height by expansion after burning compared to before burning of each of the thermosetting foams of Comparative Examples 1 to 15.

Table 4 shows test results for Examples 1 to 8, and Tables 11 and 12 below show test results for Comparative Examples 1 to 15.

TABLE 10

|  | Example 1 | Example 2 | Example 3 | Example 4 | Example 5 | Example 6 | Example 7 | Example 8 |
| --- | --- | --- | --- | --- | --- | --- | --- | --- |
| Density (kg/m$^3$) | 35 | 35 | 37 | 36 | 38 | 38 | 37 | 37 |
| Self-extinguishing time (min:sec) | 00:21 | 00:15 | 00:38 | 00:33 | 00:42 | 00:38 | 00:48 | 00:43 |
| Weight loss (g) | 5.8 | 5.4 | 6.0 | 5.7 | 6.1 | 5.9 | 6.2 | 6.1 |
| Thermal conductivity (W/mK) | 0.0204 | 0.0201 | 0.0206 | 0.0207 | 0.0212 | 0.0212 | 0.0215 | 0.0215 |
| Increase (mm) in height after burning | 9.50 | 9.51 | 4.34 | 9.10 | 4.01 | 4.04 | 4.17 | 4.54 |

TABLE 11

|  | Comp. Example 1 | Comp. Example 2 | Comp. Example 3 | Comp. Example 4 | Comp. Example 5 | Comp. Example 6 | Comp. Example 7 | Comp. Example 8 |
| --- | --- | --- | --- | --- | --- | --- | --- | --- |
| Density (kg/m$^3$) | 49 | 47 | 47 | 46 | 36 | 41 | 47 | 44 |
| Self-extinguishing time (min:sec) | 4:36 | 4:17 | 3:41 | 3:55 | x | 4:41 | 3:45 | 3:02 |
| Weight loss (g) | 8.8 | 8.5 | 7.7 | 7.7 | 10.5 | 8.9 | 7.9 | 7.4 |
| Thermal conductivity (W/mK) | 0.0238 | 0.0227 | 0.0231 | 0.0235 | 0.0205 | 0.0228 | 0.0229 | 0.0231 |
| Increase (mm) in height after burning | −5.21 | −1.30 | 1.33 | 2.74 | −7.08 | −3.81 | −3.55 | −3.10 |

TABLE 12

|  | Comp. Example 9 | Comp. Example 10 | Comp. Example 11 | Comp. Example 12 | Comp. Example 13 | Comp. Example 14 | Comp. Example 15 |
| --- | --- | --- | --- | --- | --- | --- | --- |
| Density (kg/m$^3$) | 41 | 41 | 38 | 47 | 48 | 49 | 45 |
| Self-extinguishing time (min:sec) | 2:48 | 2:53 | 1:49 | x | x | x | x |
| Weight loss (g) | 7.1 | 7.2 | 6.7 | 10.7 | 8.8 | 8.1 | 10.2 |
| Thermal conductivity (W/mK) | 0.0234 | 0.0230 | 0.0222 | 0.0230 | 0.0245 | 0.0249 | 0.0237 |
| Increase (mm) in height after burning | −1.90 | −1.81 | −0.93 | −26.21 | −3.16 | −3.00 | Not measurable |

Even though the thermosetting foams of the Examples of the present disclosure contained nanoclay, the densities thereof did not increase compared to those of the thermosetting foams of the Comparative Examples that contained no nanoclay. However, the thermosetting foams of the Examples of the present disclosure showed significantly improved flame retardant performance while the weight losses thereof after burning did not exceed 6.5 g, indicating complete dispersion of the nanoclay, the complete intercalation of the components of the thermosetting foam into the interlayer space of the nanoclay, and the exfoliation of the nanoclay. This may be evidenced by the increased height after burning. The well-dispersed nanoclay is layered between the materials constituting the thermosetting foam and serves as a barrier. When the materials start to burn, char is formed on the surface, and at this time, the generated gas and water are trapped by the nanoclay layers, and the amount of gas and water generated further increases over time. Eventually, a phenomenon appears in which the char expands. The flame is extinguished, and the expanded char increases in height by 3 mm or more while maximizing the heat shielding effect, and the phenomenon remains the same. Finally, the flame retardant performance significantly increases. However, if the isocyanurate structure realized by the trimerization catalyst or the isocyanurate compound, among the structures constituting the thermosetting foam, is not formed, a problem arises in that the above-described flame retardant performance cannot be realized only by dispersion of the nanoclay. Finally, when the thermosetting foam was produced using the expansion agent instead of the nanoclay and tested, it expanded temporarily at the beginning of the burning test, but a problem arose in that the thermosetting foam shrunk or melted without enduring a continuous flame, resulting in deterioration in the flame retardant performance.

The invention claimed is:

1. A thermosetting expanded foam having a flame retardancy which is obtained by curing an expanded foam solution with an isocyanate-based compound as a curing agent, and which is increased in height by 3 mm or more due to expansion of char and has a total weight loss of 6.5 g or less, after 5 minutes of burning according to an ISO 5660-1 burning test,
wherein
the expanded foam solution comprises:
at least one polyol-based compound;
a mixture comprising water; and
a mixture solution containing a nanoclay and having a viscosity of 5,000 cps or less, wherein the nanoclay has a water content of 0.5 to 10%.

2. The thermosetting expanded foam of claim 1, wherein the isocyanate-based compound is selected from among m-MDI (monomeric-methylene diisocyanate), p-MDI (polymeric-methylene diisocyanate), TDI (toluene diisocyanate), derivatives thereof or mixtures thereof.

3. The thermosetting expanded foam of claim 1, comprising a density of 40 kg/m$^3$ or less, a weight loss of 6.5 g or less, and a thermal conductivity of 0.022 W/mK or less.

4. A thermosetting expanded foam having a flame retardancy which is obtained by curing an expanded foam solution with an isocyanate-based compound as a curing agent, and which is increased in height by 3 mm or more due to expansion of char and has a total weight loss of 6.5 g or less, after 5 minutes of burning according to an ISO 5660-1 burning test,
wherein
the expanded foam solution comprises:
at least one polyol-based compound;
a mixture comprising water, a surfactant, a flame retardant, and a catalyst;
a mixture solution obtained by treating a nanoclay-polyol interlayer compound, which contains a nanoclay in an amount of 1 to 10 wt % based on 100 wt % of the mixture solution, with ultrasonic waves having an intensity of 200 to 3,000 W at a frequency of 20 kHz or with a pressure of 1,000 to 3,000 bar; and
a foaming agent,
wherein the mixture solution has a viscosity of 5,000 cps or less, and the nanoclay has a water content of 0.5 to 10%.

5. A thermosetting expanded foam having a flame retardancy which is obtained by curing an expanded foam solution with an isocyanate-based compound as a curing agent, and which is increased in height by 3 mm or more due to expansion of char and has a total weight loss of 6.5 g or less, after 5 minutes of burning according to an ISO 5660-1 burning test,
wherein
the expanded foam solution comprises:
at least one polyol-based compound selected from among polyester polyol and polyether polyol;
a mixture comprising water, a surfactant, a flame retardant, and a catalyst, wherein the mixture further comprises at least one of a trimerization catalyst and an isocyanurate compound;
a mixture solution composed of the at least one polyol-based compound, the mixture and a nanoclay, wherein the mixture solution is obtained by treating a nanoclay-polyol interlayer compound, which contains the nanoclay in an amount of 1 to 10 wt % based on 100 wt % of the mixture solution, with ultrasonic waves having an intensity of 200 to 3,000 W at a frequency of 20 kHz or with a pressure of 1,000 to 3,000 bar; and
a foaming agent,
wherein the nanoclay-polyol interlayer compound is formed by intercalation of the at least one polyol-based compound and the mixture into an expanded interlayer space of the nanoclay and has at least one structure selected from a urethane structure, a urea structure and an isocyanurate structure, and a molecular weight and volume of the nanoclay-polyol interlayer compound increase rapidly due to the at least one structure, so that the expanded interlayer space of the nanoclay is further expanded and exfoliation of the nanoclay occurs, and
wherein the mixture solution has a viscosity of 5,000 cps or less, and the nanoclay has a water content of 0.5 to 10%.

* * * * *